US005915119A

United States Patent [19]

Cone

[11] Patent Number: 5,915,119

[45] Date of Patent: Jun. 22, 1999

[54] PROXY TERMINAL FOR NETWORK CONTROLLING OF POWER MANAGED USER TERMINALS IN SUSPEND MODE

[75] Inventor: Kevin A. Cone, Whitehall, Pa.

[73] Assignee: NCR Corporation, Dayton, Ohio

[21] Appl. No.: 08/724,653

[22] Filed: Oct. 1, 1996

[51] Int. Cl.[6] .................... G06F 1/32

[52] U.S. Cl. .................... 395/750.02; 395/200.79; 395/200.57; 395/200.53

[58] Field of Search .................... 395/750.02, 750.05, 395/200.38, 200.39, 200.72, 200.79, 34, 312, 200.53, 200.57; 370/401, 402, 397, 200.5, 200.75, 200.8; 340/825.44

[56] References Cited

U.S. PATENT DOCUMENTS

| | | | |
|---|---|---|---|
| 4,695,946 | 9/1987 | Andreasen et al. | 364/200 |
| 4,903,016 | 2/1990 | Murai et al. | 340/825.07 |
| 5,008,814 | 4/1991 | Mathur | 364/200 |
| 5,155,847 | 10/1992 | Kirouac et al. | 395/600 |
| 5,339,437 | 8/1994 | Yuen | 395/700 |
| 5,394,527 | 2/1995 | Fakhruddin et al. | 395/275 |
| 5,404,544 | 4/1995 | Crayford . | |
| 5,425,026 | 6/1995 | Mori . | |
| 5,517,620 | 5/1996 | Hashimoto et al. | 395/200.15 |
| 5,802,305 | 9/1998 | McKaughan et al. | 395/200.57 |

*Primary Examiner*—Ayaz R. Sheikh
*Assistant Examiner*—Rupal D. Dharia
*Attorney, Agent, or Firm*—Ying Tuo

[57] ABSTRACT

A network system comprises a plurality of network segments. Each of the network segments connects a plurality of user terminals that can be set in a suspend mode. When a network segment is connected to the network system via a router, it is possible that the network address of a user terminal is deleted from the routing table in the router during an aging process. In this situation, the user terminal is not accessible in the suspend mode via the router. To solve this problem, a proxy terminal is connected to a network segment to receive requests from the router for the user terminals connected to that network segment. In response to a request from the router to a destined user terminal located in that network segment, the proxy terminal wakes up the destined user terminal, thus restoring the access to the destined user terminal.

15 Claims, 4 Drawing Sheets

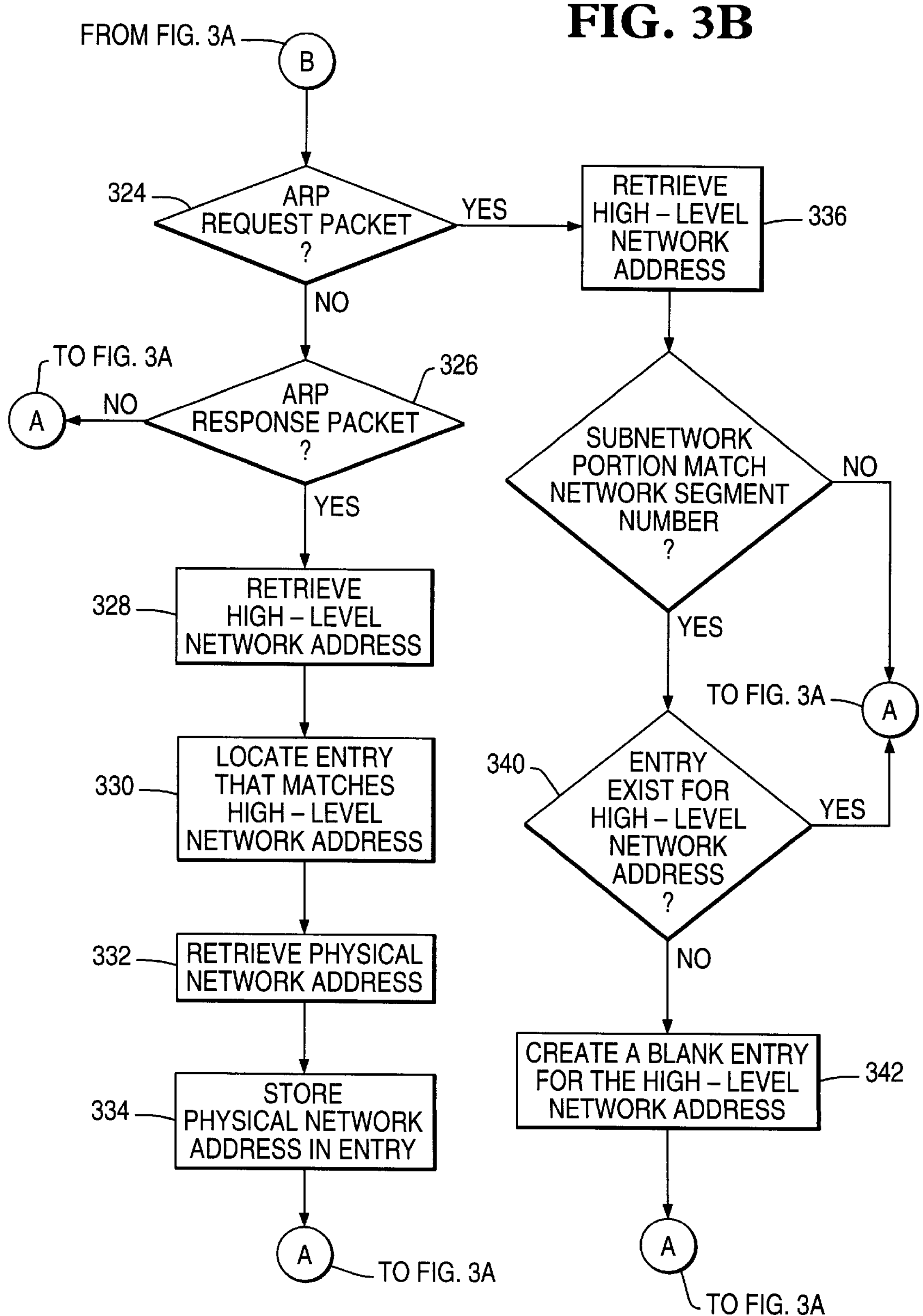
FIG. 3B
FROM FIG. 3A
B
324
ARP REQUEST PACKET ?
YES
NO
RETRIEVE HIGH – LEVEL NETWORK ADDRESS
336
TO FIG. 3A
A
NO
ARP RESPONSE PACKET ?
326
YES
RETRIEVE HIGH – LEVEL NETWORK ADDRESS
328
LOCATE ENTRY THAT MATCHES HIGH – LEVEL NETWORK ADDRESS
330
RETRIEVE PHYSICAL NETWORK ADDRESS
332
STORE PHYSICAL NETWORK ADDRESS IN ENTRY
334
A
TO FIG. 3A
SUBNETWORK PORTION MATCH NETWORK SEGMENT NUMBER ?
NO
YES
TO FIG. 3A
A
340
ENTRY EXIST FOR HIGH – LEVEL NETWORK ADDRESS ?
YES
NO
CREATE A BLANK ENTRY FOR THE HIGH – LEVEL NETWORK ADDRESS
342
A
TO FIG. 3A C
FROM FIG. 3A
358
WAKE UP COMMAND ?
NO
A
TO FIG. 3A
YES
360
RETRIEVE HIGH – LEVEL NETWORK ADDRESS
362
LOCATE ENTRY THAT CONTAINS THE HIGH – LEVEL NETWORK ADDRESS
363
PHYSICAL NETWORK ADDRESS UNMARKED ?
YES
364
SEND A FAILURE CODE
A
TO FIG. 3A
NO
RETRIEVE PHYSICAL NETWORK ADDRESS FROM ENTRY
365
CREATE MAGIC PACKET WITH PHYSICAL NETWORK ADDRESS
366
SEND MAGIC PACKET
368
SEND A COMPLETE CODE
369
A
TO FIG. 3A

PROXY TERMINAL FOR NETWORK CONTROLLING OF POWER MANAGED USER TERMINALS IN SUSPEND MODE

BACKGROUND OF THE INVENTION

The present invention relates to a method and apparatus for bringing user terminals that are connected to networks out of suspend mode.

A modern user terminal, such as a workstation or personal computer (PC), provides an advanced power management (APM) feature, in which the user terminal can be set in a hibernation state (called suspend mode). In suspend mode, most of the components of a user terminal are in a state that consumes minimal power, and are not functional; some of the components, such as the system bus, are completely un-powered. Conventionally, a user terminal can be brought out of suspend mode by a user's activation of an input device, such as a mouse or keyboard, indicating the user requires full functionality of the terminal to perform work.

A problem occurs when a network management station tries to get access to a user terminal in suspend mode via a network, because the user terminal is no longer listening to the network in suspend mode. As a result, the user terminal will not respond to network management commands from across the network. Without having access to the user terminal, it is impossible to perform backups for the user terminal, to configure the user terminal, or to do software distribution to the user terminal via the network.

At present, a leading solution to this problem is, while a user terminal is in suspend mode, to power its network adapter to the degree that the network adapter can listen to the network (to which the user terminal is coupled). A special circuitry is used to look for a data packet with a special data pattern. Upon receiving the unique data packet, the network adapter generates a special interrupt to bring that user terminal out of suspend mode. In introducing such a technology, Advanced Micro Devices and Hewlett Packard have used the special data pattern in a packet (called magic packet). This special data pattern is the unique network address of the user terminal in suspend mode and repeated sixteen times within the magic packet.

Unfortunately, it does not work to use the magic packet approach to wake up user terminals when the magic packet is sent across a network that uses routers to separate the network into segments. A router can take a magic packet generated from one network segment and forward it to an intended user terminal located on another network segment according to the path information indicated by a routing table inside the router. To improve efficiency, the router frequently updates its routing table, and the aged routing information of the routing table may be replaced by new routing information. Thus, it can occur that from one network segment a router receives a magic packet destined to a user terminal on another network segment after the path information to the user terminal has been deleted from its routing table. Under this situation, before routing the magic packet, the router could send a broadcast packet to all the segments connected to it and wait for the acknowledgment from the network on which the user terminal is located. However, if the destined user terminal is in suspended mode, it will only listen to a magic packet, and will not respond to the broadcast packet. When the router hears no acknowledgment from the destined user terminal, it will assume that the destined user terminal does not exist and discard the magic packet. As a result, the destined user terminal can never be brought out of suspended mode by the magic packet.

Therefore, in the situation where user terminals are connected to a network via a routing device whose routing information is periodically updated, there is a need to provide an apparatus and method that can restore access to the user terminals via the network when the user terminals are in a suspend mode.

The present invention meets this need.

SUMMARY OF THE INVENTION

In one aspect, the invention provides an apparatus for bringing a plurality of user terminals being connected to a network out of a suspend mode. The apparatus comprising:

- a storage area capable of storing network addresses for the plurality of user terminals, said storage area maintaining all of said network addresses while said user terminals are connected to said network;
- a receiver logic capable of receiving a request to bring one of the user terminals out of the suspend mode; and
- a processor logic capable of, in response to said request, generating a command to said one user terminal based upon a network address that is assigned to said one user terminal and stored in said storage area, whereby said terminal is brought out of the suspend mode in response to said command.

In another aspect, the invention provides an apparatus, connected to a network, for bringing a plurality of user terminals out of a suspend mode. The apparatus comprises:

- a receiver logic capable of receiving from the network all command packets that contain commands to bring particular ones of said user terminals out of the suspend mode regardless of their destination network addresses in said command packets, said command packets also containing command addresses that identify said particular ones of user terminals;
- a receiver logic capable of receiving from said network regular packets having a network address assigned to the apparatus; and
- a processor logic, in response to said command packets, capable of generating commands to bring said particular ones of user terminals identified by said command addresses out of the suspend mode.

In still another aspect, the invention provides a system, which comprises:

- a first routing device, connected to a network, for connecting a plurality of user terminals to said network, each of said user terminals having a network address, said user terminals can be set in a suspend mode, said first routing device having a routing table containing network addresses for said user terminals, said routing table in said first routing device being updated so that some of said network address can be deleted from said routing table in said first routing device while said user terminals are connected to said network; and
- a second routing device having a routing table containing network addresses for said user terminals, said routing table in said second routing device maintaining all of said network addresses while said user terminals are connected to said network.

The invention also provides respective methods in corresponding to the above-mentioned three aspects.

BRIEF DESCRIPTION OF THE DRAWINGS

The purpose and advantages of the present invention will be apparent to those skilled in the art from the following detailed description in conjunction with the appended drawing, in which:

FIG. 3B is a flowchart illustrating the steps of processing an ARP packet, in accordance with the present invention.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
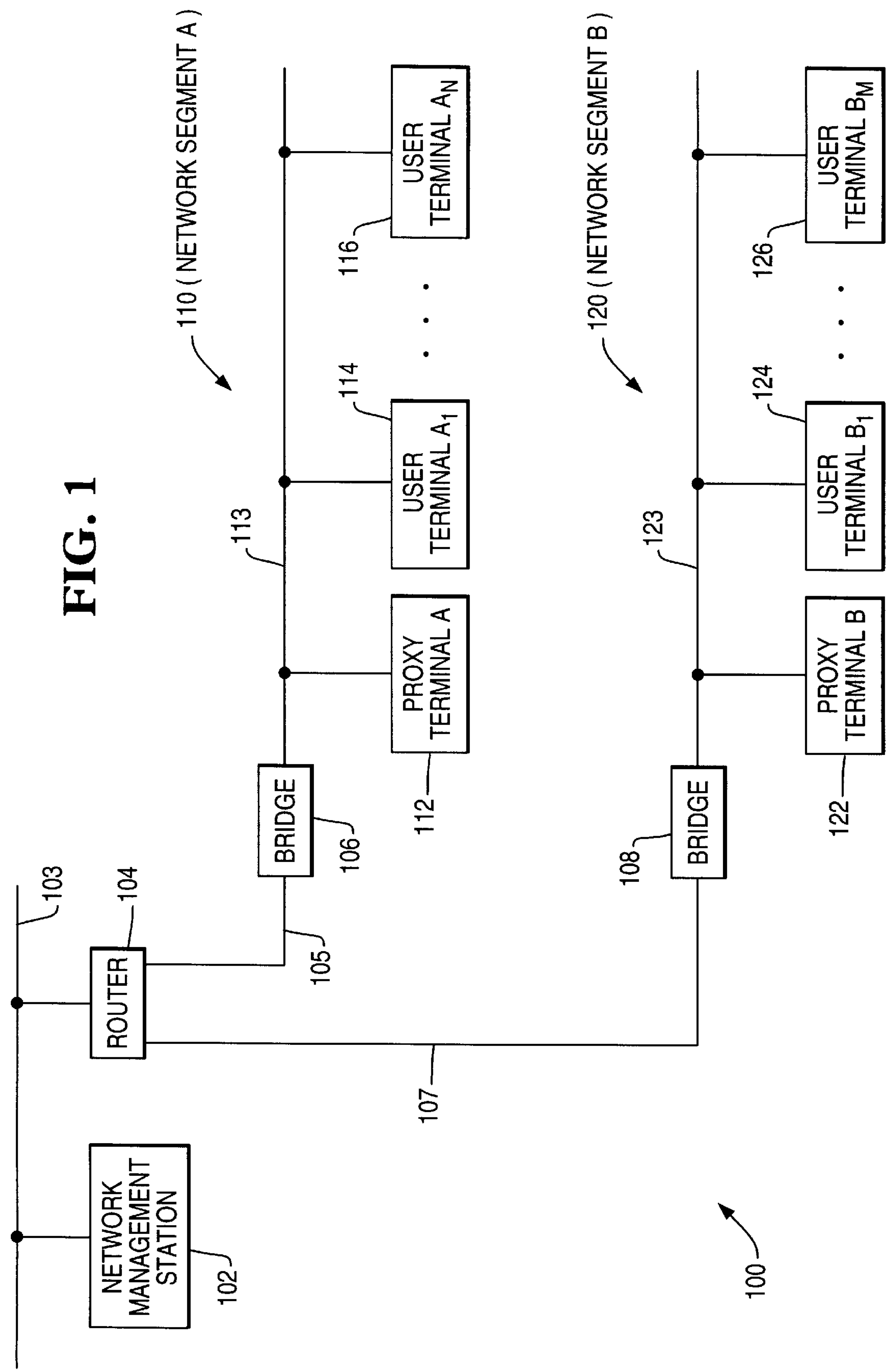
FIG. 1 shows a network including two network segments that are separated by a router, in accordance with the present invention.

Referring to FIG. 1, there is shown a network 100, including a network management station 102, a router 104, two bridges (106 and 108), network segment A (110), and network segment B (120).

As shown in FIG. 1, network segment A includes a proxy terminal or router A (112) and a plurality of user terminals from $A_1$ to $A_N$. Proxy terminal A and the user terminals from $A_1$ to $A_N$ are all coupled to network local bus 113, which is in turn coupled to router 104 via link 105.

Network segment B includes a proxy terminal or router B (122) and a plurality of user terminals from $B_1$ to $B_M$. Proxy terminal B and the user terminals from $B_1$ to $B_M$ are all coupled to network local bus 123, which is in turn coupled to router 104 via link 107.

Bridge 106 is able to pass packets between network local bus 113 and link 105. Bridge 108 is able to pass packets between network local bus 123 and link 107.

In FIG. 1, the proxy terminals and user terminals can be personal computers or workstations. Each of user terminals is capable of being set in suspend mode and able to respond to the unique pattern packet (called magic packet) in suspend mode. The proxy terminals remain "alert" while any or all of the user terminals are in suspend mode.

Router 104 is coupled to network management station 102 via network bus 103. Router 104 maintains a routing table that maps user terminals' high-level (or logical) network addresses (such as IP (Internet Protocol) addresses) against user terminals' physical addresses (such as 48 bit IEEE format MAC (Media Access Control) address). The routing table also contains network segment numbers, which will not be deleted and replaced by new routing information in aging process. As shown in FIG. 1, all terminals connected to a network segment (A or B) have a common network segment number.

Each of proxy terminals A and B also maintains a routing table for the user terminals that are connected to its respective network segment (A or B). Like routing table in router 104, the routing table in proxy terminal A or B contains high-level (logical) network addresses that map against physical network addresses. Unlike routing table in router 104, however, the network addresses routing table in proxy terminal A or B will not be deleted in aging process. Therefore, a high-level network address assigned to one of the user terminals shown in FIG. 1 may disappear from the routing table in router 104, but it will stay in and be known by proxy terminal A or B, so long as the terminal is connected to network segment A or network segment B. In addition, the routing table in proxy terminal A or B contains the segment number for the network segment to which it is connected.

It is known that router 104 can use a two-step process in compliance with the so called address resolution protocol (ARP) to build and update its routing table. Some protocol suits, such as TCP/IP and Microsoft's Server Message Block (SMB), include such an address resolution protocol. In the ARP process, the router first broadcasts a packet (called an ARP request packet) containing the high-level network address of a destined user terminal that the router is looking for. Upon receiving the broadcast packet, the designated user terminal returns to the router a packet (called ARP response packet) containing the high-level network address and its physical network address. After receiving the returned packet, the router stores the pair of network addresses into its routing table.

In the present invention, a proxy terminal (A or B) can use this two step process to build its own routing table. In the first step, while a router (104) is broadcasting a packet that contains high-level network address of a user terminal that the router is looking for, a proxy terminal (A or B) listens and receives this packet. The proxy terminal first checks the subnetwork portion of the high-level network address, and if the subnetwork does not match its own segment number, it discards the packet. If the subnetwork portion does match its own segment number, it further checks its routing table, to decide whether the high-level network address in the packet exists in the routing table. If the high-level network address does not exist in the routing table, the proxy terminal creates a new entry to store the high-level network address. The physical network address for that new entry is marked as unknown at this step.

In the second step, for the proxy terminal located on the same network segment with the user terminal that the router is looking for, it can listen and receive the response packet returned from the user terminal to the router. As discussed above, this returned packet contains the high-level network address originally requested by the router and the physical network address assigned with the user terminal. Upon receiving the returned packet, the proxy terminal stores the physical network address into the entry corresponding to the high-level network address.

In the second step, for the proxy terminal located on different network segment from the user terminal that the router is looking for, no response packet will be received from any user terminals from the segment it sits. Since no new routing table entry was created in the first step, no further action is needed.

To bring a user terminal out of suspend mode, network management station 102 sends a management request imbedded in a packet (called management request packet) via router 104 to network segment A or network segment B. A management request from a management station should comply with a predetermined network management protocol, such as Simple Network Management Protocol (SNMP), Common Management Information Protocol (CMIP), or other propriety network management protocol. A management request packet contains a command section to perform different functions, such as: reading network management information from a user terminal, or writing network management information into a user terminal, along with a data section that may contain data associated with the command. In this case, the management request packet contains in its command section a command to wake-up a particular user terminal from suspend mode, and in the data section the high-level address of the particular terminal. In this example, it is assumed that: (1) Network management station 102 has sent a management request packet to proxy terminal B via router 104 with a command to bring user terminal $B_1$ out of suspend mode. Router 104 sends the request packet to proxy station B based on the subnetwork portion of the high-level network address in the management packet (in this case, subnetwork portion indicates network segment B); (2) User terminal $B_1$ is in suspend mode; and (3) The management request packet contains the high-level network address assigned to user terminal $B_1$.

Upon listening to the management request packet, proxy terminal B receives the packet and locates the entry of its routing table, which contains the high-level network address. Since user terminal $B_1$ is located in network segment B, proxy terminal B can find the physical network address that corresponds to the high-level network address. In compliance with the command in the management request packet, proxy terminal B builds a magic packet, sends it to user terminal $B_1$ based on the physical network address assigned to terminal $B_1$, and returns a completion code to management station 102.

Since the network adapter of user terminal $B_1$ is powered to the degree to listen to the magic packet, it responds to the magic packet by generating a special interrupt to bring user terminal $B_1$ out of suspend mode.

Figure 2:
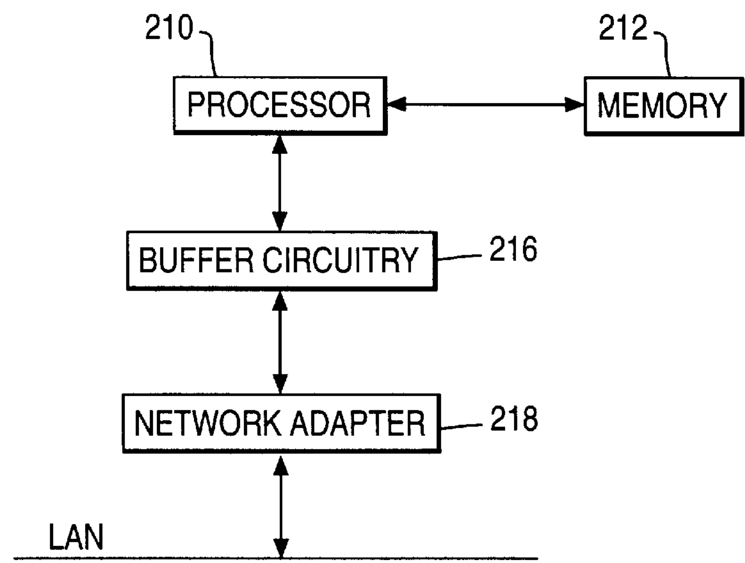
FIG. 2 shows a block of diagram of a proxy terminal, in accordance with the present invention.

Referring to FIG. 2, there is shown a block diagram of proxy terminal A or B.

As shown in FIG. 2, the proxy terminal includes a processor 210, a memory 212, a buffer circuitry 216, and a network adapter 218. Memory 212 is able to store programs (which comprise instructions and data). Buffer circuitry 216 is able to store management request packets, ARP packets, and magic packets generated by processor 210. Network adapter 218 is able to listen for, receive ARP packets and management request packets from network local bus 113 (or 123), and to store them in buffer circuitry 216 for processing by processor 210. Network adapter 218 is also able to read respond packets that contain response codes generated by processor 210 and stored in buffer circuitry 216, and to transmit them to network management station 102 via router 104. Network adapter 216 is further able to read magic packets generated by processor 210 and stored in buffer circuitry 216, and to transmit them to the user terminals on the network segments it connects. To listen for and receive all management request packets, respond packets, and ARP packets from the network segment to which it is connected, network adapter 218 is set to be "promiscuous" to these types of packets. However, network adapter 218 also has its own network address to other types of packets, meaning it listens to the other types of packets, but only acts upon the packets that contain network addresses matching its own network address. Processor 210 has access to memory 212 and is able to execute the programs stored in the memory to perform desired functions. The processor is also able to control the operation of, and manipulate the contents (such as data or packets) stored in, buffer circuitry 216.

Figure 3A:
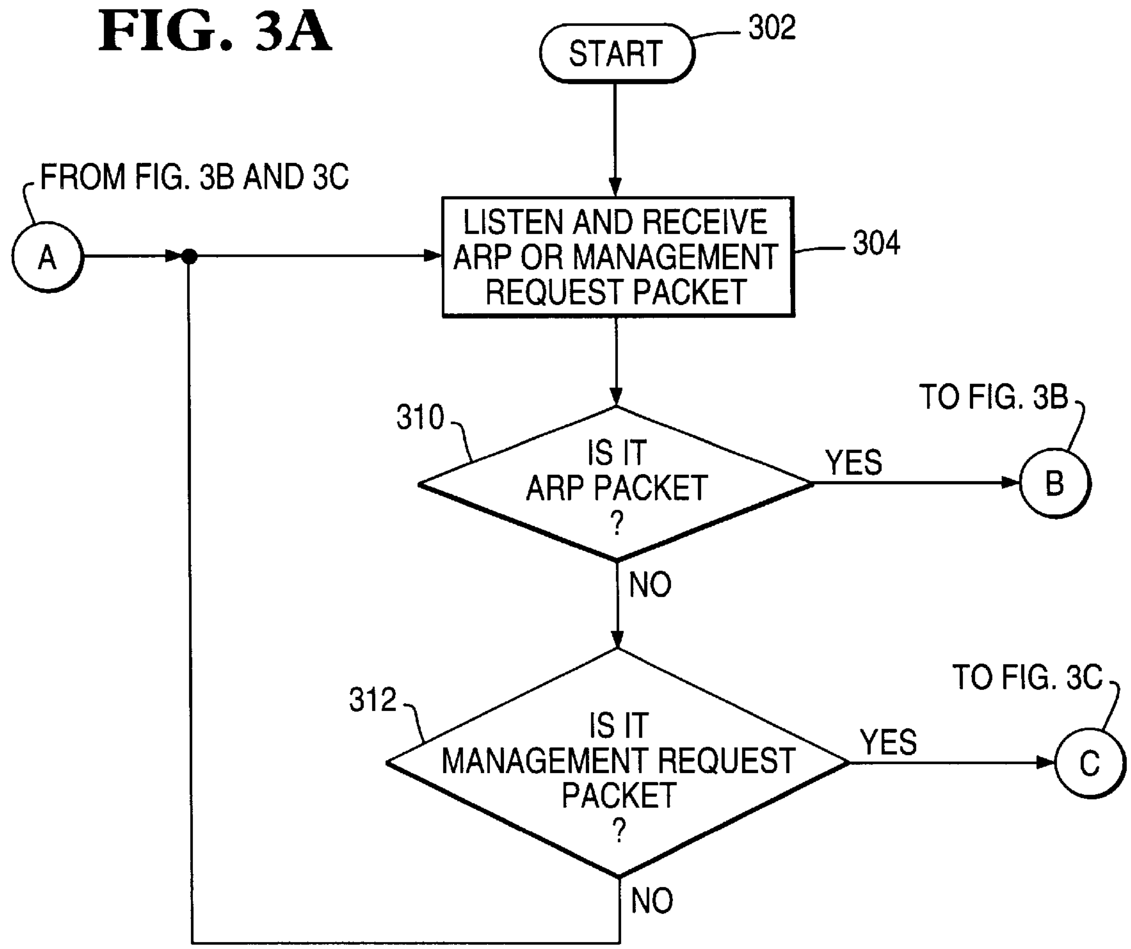
FIG. 3A is a flowchart illustrating operational steps of processing ARP packets and management request packets, in accordance with the present invention.

Referring to FIG. 3A, there is shown a flowchart illustrating operational steps of processing ARP packets and management request packets, in accordance with the present invention.

In step 304, a proxy terminal (A or B) listens and receives an ARP packet or a management request packet that is delivered to its network adapter 218 (see FIG. 2).

In step 310, the proxy terminal determines whether the received packet is an ARP packet. If the determination is positive, the operation is led to FIG. 3B. If the determination is negative, the operation is led to step 312.

In step 312, the proxy terminal determines whether the packet received is a management request packet. If the determination is negative, the packet is discarded, and the operation is led back to step 304. If the determination is positive, the operation is led to FIG. 3C.

Referring to FIG. 3B, there is shown a flowchart illustrating the steps of processing an ARP packet, in accordance with the present invention.

In step 324, the proxy terminal (proxy terminal A or B) determines whether the received ARP packet is an ARP request packet. If the determination is negative, the operation is led to step 326. If the determination is positive, the operation is led to step 336.

In step 336, the proxy terminal retrieves the high-level network address contained in the ARP request packet.

In step 337, the proxy terminal determines whether the subnetwork portion in high-level network address matches the segment number of network segment B. If the determination is negative, the operation is led back to step 304 in FIG. 3A. If the determination is positive, the operation is led to step 340.

In step 340, the proxy terminal determines whether an entry exists in its routing table for the high-level network address. If the determination is positive, the operation is led back to step 304 in FIG. 3A. If the determination is negative, the proxy terminal creates a blank entry in the routing table and stores the high-level network address into this newly created entry. Then, the operation is led to step 304 in FIG. 3A.

If the determination in step 324 is negative, the operation is led to step 326 to further determine whether the received packet is an ARP response packet.

In step 326, if the determination is negative, the operation is led back to step 304 in FIG. 3A. If the determination is positive, the operation is led to step 328.

In step 328, the proxy terminal retrieves the high-level network address from the ARP response packet.

In step 330, the proxy terminal locates the entry from its routing table, which contains the high-level network address.

In step 332, the proxy terminal retrieves the physical network address from the ARP response packet.

In step 334, the proxy terminal stores the physical address into the entry that contains the high-level network address. Then, the operation is led to step 304 in FIG. 3A.

Figure 3C:
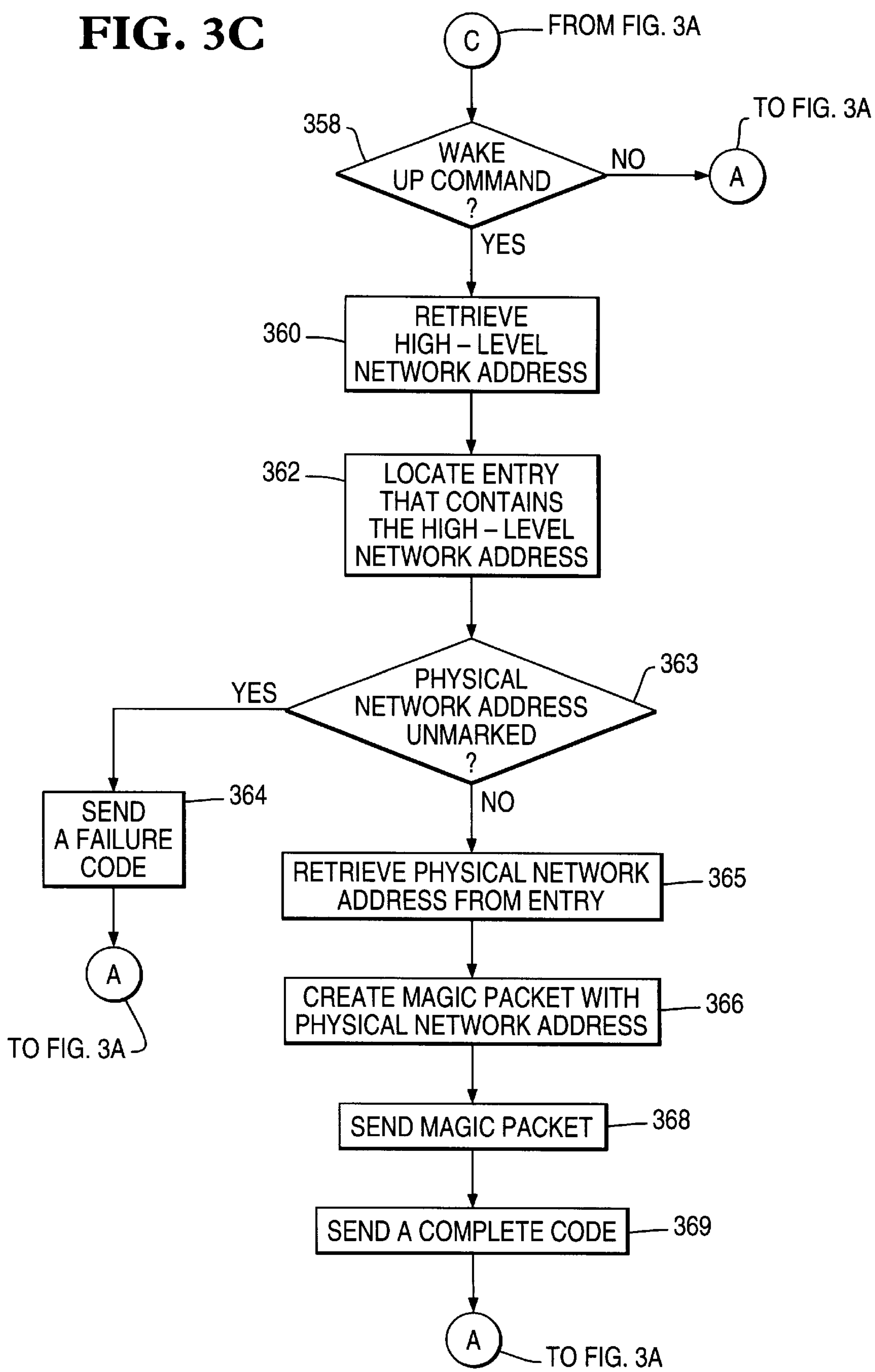
FIG. 3C is a flowchart illustrating the steps of processing a management request packet, in accordance with the present invention.

Referring to FIG. 3C, there is shown a flowchart illustrating the steps of processing a management request packet, in accordance with the present invention.

In step 358, the proxy terminal (proxy terminal A or B) determines whether the received request packet contains a command to wake up a user terminal. If the determination is negative, the operation is led to step 304 in FIG. 3A. If the determination is positive, the operation is led to step 360.

In step 360, the proxy terminal retrieves the high-level network address from the received request packet.

In step 362, the proxy terminal locates the entry from its routing table, which contains the high-level network address.

In step 363, the proxy terminal determines whether the physical network address in the located entry is unmarked. If the determination is positive, the operation is led to step 364 in which the proxy terminal sends a failure code to the sender of the management request packet. The operation is then led to step 304 in FIG. 3A.

In step 363, if the determination is negative, the operation is led to step 365, in which the proxy terminal retrieves the physical network address from the located entry.

In step 366, the proxy terminal creates a magic packet.

In step 368, the proxy terminal sends the magic packet containing the physical network address to the user terminal associated with the physical network address, to bring it out of suspend mode.

In step 369, the proxy terminal sends a complete code to the sender of the management request packet. Then, the operation is led to step 304 in FIG. 3A.

In the present invention, the programs for performing the functions shown in FIGS. 3A, 3B and 3C can be stored in memory 212 and executed by processor 210.

While the invention has been illustrated and described in detail in the drawing and foregoing description, it should be understood that the invention may be implemented through alternative embodiments within the sprit of the present invention. Thus, the scope of the invention is not intended to be limited to the illustration and description in this specification, but is to be defined by the appended claims.

What is claimed is:

1. For use with a network having a router that includes a routing table for storing a plurality of network addresses, an apparatus for bringing a plurality of user terminals connected to said network out of a suspend mode, comprising:

a storage area capable of storing network addresses for the plurality of user terminals;

a transmitter logic capable of transmitting command packets to said plurality of user terminals;

a receiver logic capable of (i) causing a first network address for one user terminal of the plurality of user terminals to be stored in said storage area in response to receiving from said router an address request packet directed to said one user terminal, (ii) causing a second network address for said one user terminal to be stored in said storage area in response to receiving an address response packet from said one user terminal, and (iii) receiving, after said router has removed said second network address for said one user terminal from said routing table, a management request packet to bring said one user terminal out of the suspend mode; and a processor logic capable (i) obtaining said second network address from said storage area in response to said receiver logic receiving said management request packet, (ii) generating, based upon said second network address obtained from said storage area, a command packet to bring said one user terminal out of the suspend mode, and (iii) causing said transmitter logic to transfer said command packet to said first user terminal via said network.

2. The apparatus of claim 1, wherein:

said processor logic is further capable of (iv) generating said command packet such that said command packet includes a unique pattern to which said one user terminal is responsive when said one user terminal is in the suspend mode.

3. The apparatus of claim 1, wherein:

said receiver logic is further capable of (iv) receiving said first network address assigned to said one user terminal via said management request packet, and said processor logic is further capable of (iv) obtaining said second network address from said storage area based upon said first network address received via said management request packet.

4. The apparatus of claim 1, wherein:

said receiver logic is further capable of (iv) receiving a logical network address for said one user terminal via said address request packet, (v) receiving a physical network address for said one user terminal via said address response packet, (vi) causing said logical network address to be stored in said storage area as said first network address, and (vii) causing said physical network address to be stored in said storage area as said second network address.

5. The apparatus of claim 4, wherein:

said receiver logic is further capable of (viii) receiving said logical network address for said one user terminal via said management request packet, and said processor logic is further capable of (iv) obtaining said physical network address from said storage area based upon said logical network address received via said management request packet.

6. The apparatus of claim 1, wherein:

said network comprises a network segment, the plurality of user terminals are connected to said network segments, said receiving logic is coupled to said network segment, and said processor logic is further capable of (iv) discarding said management request packet if said management request packet is not directed to said network segment.

7. A system comprising:

a first routing device, connected to a network, for connecting a plurality of user terminals to said network, each of said user terminals having a network address, said user terminals can be set in a suspend mode, said first routing device having a routing table containing network addresses for said user terminals, said routing table in said first routing device being updated so that some of said network addresses can be deleted from said routing table in said first routing device while said user terminals are connected to said network; and a second routing device having a routing table containing network addresses for said user terminals, said routing table in said second routing device maintaining all of said network addresses while said user terminals are connected to said network, wherein said first routing device further comprises a transmitter logic capable of sending a request to bring one of said user terminals out of said suspend mode; and said second routing device further comprises a processor logic capable of, in response to said request, generating a command to bring said one user terminal out of said suspend mode.

8. The system of claim 7, said command being a packet having a unique pattern.

9. The system of claim 8, wherein said network is a network segment, and wherein both said second routing device and the plurality of user terminals are coupled to said network segment.

10. For use with a network having a router that includes a routing table for storing a plurality of physical network addresses for a plurality of network devices, an apparatus, connected to said network, for bringing said plurality of network devices out of a suspend mode, comprising:

a storage area capable of storing logical network addresses and corresponding physical network addresses for the plurality of network devices;

a transmitter logic capable of transmitting command packets to said plurality of network devices;

a receiver logic capable of (i) receiving an address request packet from said router that includes a logical network address for a first network device of said plurality of network devices, (ii) receiving an address response packet from said first network device that includes a physical network address for said first network device and said logical network address for said first network device, (iii) causing said physical network address to be stored in said storage area such that said physical network address for said first network device may be obtained from said logical network address for said network device, and (iv) receiving, after said router has removed said physical network address for said first network device from said routing table, a management request packet that includes said logical network address for said first network device and a command to bring said network device out of said suspend mode; and a processor logic capable of (i) obtaining said physical network address for said first network device from said storage area in response to receiving said logical network address for said first network device via said management request packet, (ii) generating a command packet to bring said first network device out of said suspend mode that includes said physical network address for said first network device, and (iii) causing said transmitter logic to transfer said command packet to said first network device via said network in order to bring said first network device out of said suspend mode.

11. The apparatus of claim 10, wherein:

said receiver logic is further capable of (iv) being set to a promiscuous mode which configures the receiver logic to receive said management request packet regardless of said logical network address in said management request packet.

12. The apparatus of claim 10, wherein:

said network comprises a network segment, the plurality of network devices are connected to said network segments, said receiving logic is coupled to said network segment, and said processor logic is further capable of (iv) discarding said management request packet if said logical network address of said management request packet indicates that said management request packet is not directed to said network segment.

13. A method for bringing a plurality of network devices connected to a network out of a suspend mode, comprising the steps of:

a) storing a plurality of logical network addresses for said plurality of network devices and a plurality of corresponding physical network addresses for said plurality of network devices in a first routing device coupled to said network;

b) storing said plurality of logical network addresses for said plurality of network devices and said plurality of corresponding physical network addresses for said plurality of network devices in a second routing device coupled to said network;

c) removing a first physical network address for a first network device of said plurality of network devices from said first routing device;

d) receiving from said first routing device with said second routing device after step c), a request to bring said first network device out of the suspend mode, said request including a first logical network address for said first network device; and e) in response to receiving said request, e1) obtaining said first physical network address for said first network device from said second routing device in response to receiving said first logical network address for said first network device via said request, e2) generating a command packet to bring said first network device out of said suspend mode that includes said first physical network address for said first network device, and e3) transferring said command packet to said first network device via said network in order to bring said first network device out of said suspend mode.

14. The method of claim 13, further comprising the steps of:

f) transferring a plurality of address request packets from said first routing device to said plurality of network devices, each address request packet of said plurality of address request packets including a logical network address for a network device of said plurality of network devices; and g) transferring a plurality of address response packets from said plurality of network devices to said first routing device and said second routing device, each address response packet of said plurality of address response packets including a logical network address and a corresponding physical network address for a network device of said plurality of network devices, wherein steps a) and b) store said plurality of logical network addresses and said plurality of corresponding physical network addresses in response to steps f) and g).

15. The method of claim 13, wherein step b) further comprises the step of:

b1) determining that a logical network address corresponds to a network segment to which said second routing device is coupled prior to storing said logical network address and corresponding physical network address in said second routing device.

* * * * *